United States Patent Office 3,082,566
Patented Mar. 26, 1963

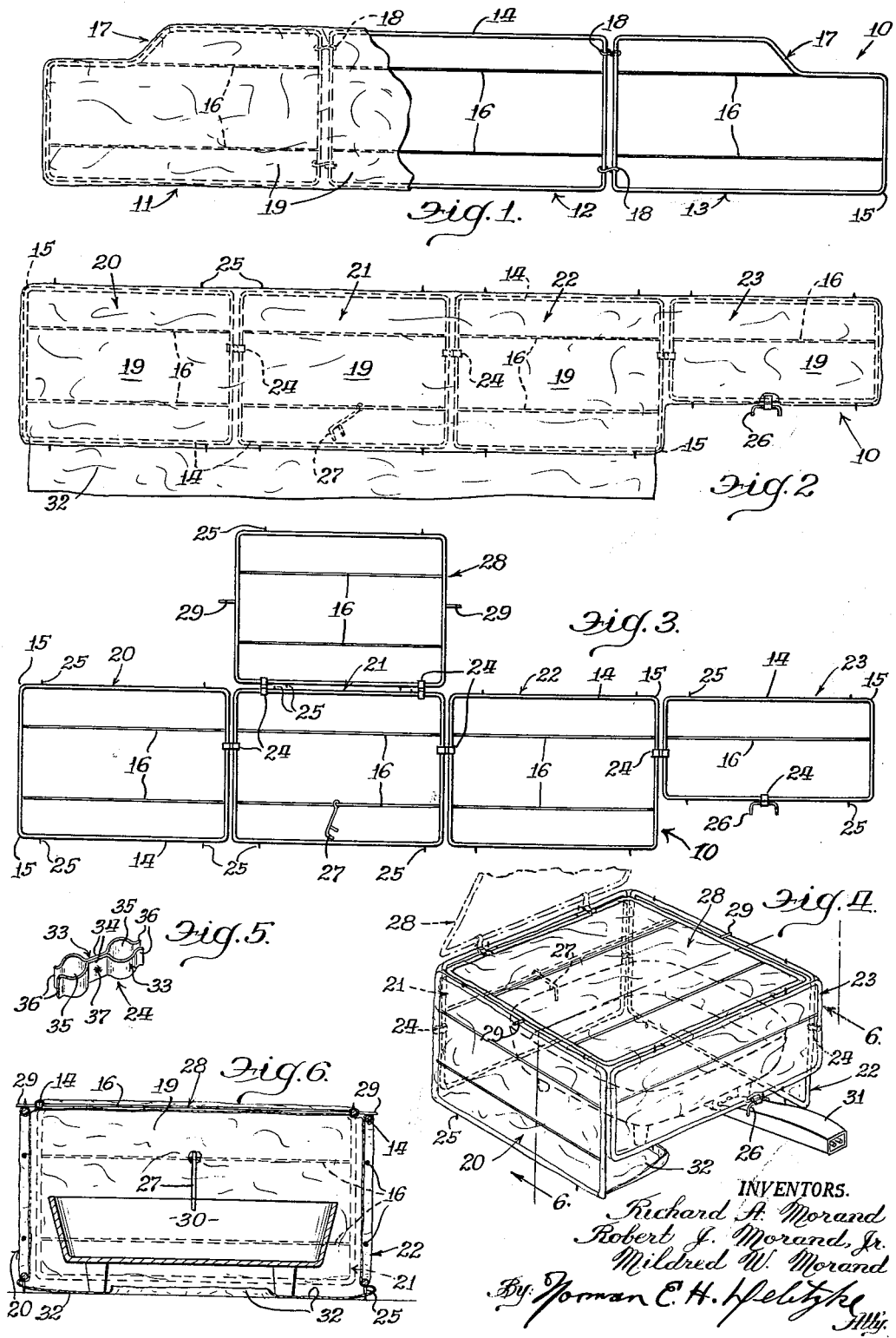

3,082,566
UTENSIL SCREEN
Richard A. Morand, Robert J. Morand, Jr., and Mildred W. Morand, all of 723 N. State Road, Arlington Heights, Ill.
Filed June 7, 1961, Ser. No. 115,386
15 Claims. (Cl. 45—68)

This invention relates to improvements in culinary devices, particularly screens for cooking utensils.

More specifically stated, this invention pertains to improvements in readily collapsible, grill type of screens or protective enclosures well adapted for use with modern cooking utensils, as for example, electrically heated frying pans, and which improved screen is provided on its inner surfaces with a readily removable and highly polished and readily disposable metal foil covering, whereby to prevent the spattering of greases, oils, liquids, or like food particles from the utensil onto adjacent walls, table tops or other surfaces, and to protect the persons near the utensil, and to insulate such adjacent surfaces against the heat dissipated by the utensil and to reflect heat dissipated by the utensil back to the utensil, thereby improving the heating efficiency and the cooking characteristics of the utensil.

It is a well recognized fact that in the use of utensils, such as the electric types of frying pans which are frequently used at a dining table, breakfast table, or in similar locations, there is an ever present danger of spattering hot food particles, greases, etc. onto table tops, walls and onto persons in the immediate vicinity of the hot utensil, thereby injuring such persons and damaging the thus spattered or overheated surfaces.

It is also a well known fact that the localization of heat in one surface of a frying pan, makes it more diffcult to secure the desired cooking effects in such a utensil.

Screens or enclosures which are sometimes provided for use in conjunction with utensils, while such utensils are being heated on stoves, or the like, are commonly of cumbersome construction and difficult to store and difficult to maintain in sanitary condition, and, due to their relatively heavy construction, render them heat absorptive and therefore dangerous to handle.

It is therefore one of the objectives of this invention to provide new, novel and useful improvements in a protective screen for a utensil, which is simple in construction, which is relatively inexpensive and relatively easy to produce, which is light in weight and may be used with great ease and effectiveness and safety to prevent the spattering of food particles from a heated utensil onto adjacent surfaces of walls and table tops and onto nearby persons, which will insulate such adjacent surfaces against damage from heat dissipated by the utensil, and which will reflect such dissipated heat back to the utensil to improve the heating efficiency of the utensil and also improve the cooking characteristics of the utensil.

Another object of this invention is to provide an improved screen for a utensil which is provided with a highly polished and readily disposable metal foil covering supported thereon in readily releasable manner and to provide support means for such metal foil covering which support means enables the easy and rapid application of such foil covering to the grill type of frame portions of the screen and/or enables the easy and rapid removal of such foil covering from the screen, thereby making possible the easy maintenance of the improved screen in sanitary condition.

Another object of this invention is to provide an improved sectional screen, which may be of the metal grill type, for covering with metal foil, which screen is so constructed that when it is not in use it may be readily collapsed into compact form for easy storage, and wherein the several sections of the screen may be quickly and easily assembled and/or disassembled by the use of novel snap-on type hinge elements pivotally connecting the several sections of the screen, and wherein the several sections of the screen may be relatively adjusted vertically and angularly with respect to one another.

A still further object of this invention is to provide a sectional screen of the metal grill type for covering with metal foil, wherein one of the sections of the screen is appreciably narrower than the remaining sections of the screen, whereby to permit the closing of the screen over the handle of the utensil, such as a frying pan, and wherein there is also provided a hinged lid section whereby to also cover the space immediately above the utensil.

Another object of this invention is to provide improvements in the retainers for the metal foil covering of the screen, some of which retainers also function as supports for the screen, and wherein one edge of the metal foil covering of the screen is so supported as to enable the formation therefrom of a collecting trough at the lower edge of the screen, which collecting trough also functions as a protective covering for the utensil supporting surface immediately between the bottom of the screen and the utensil.

The reference in this application to the hereinbefore and the hereinafter mentioned particular usefulness of the preferred embodiment of this invention is made for the purpose of example only and is not to be interpreted as a limitation of the invention. Accordingly, the hereinafter contained description of the preferred embodiment of the invention will concern itself primarily with the novel structural aspects of the improved utensil screen in forms well adapted for use in connection with modern frying pans.

The present invention possesses the advantages of providing an inexpensive, simple, light weight, and effective improved screen for a utensil, such as a frying pan, which screen is easy to use and easy to maintain in sanitary condition, and which is readily assemblable and disassemblable, and which is covered with a highly polished and easily applicable and easily removable metal foil covering which simultaneously functions as a splatter guard and as an insulating shield and as a heat reflector to improve the heating efficiency and cooking characteristics of the utensil. The improved screen device also possesses the further advantages that, due to the unique hinging arrangement for the several sections of the screen, the sections of the screen may be vertically and angularly adjusted and the screen may be readily collapsed or may be readily separated into separate sections for easy storage in compact arrangement.

The foregoing and other objectives, important novel and useful features and advantages of this invention will become more apparent and be more easily understood upon examination of the following description thereof and the accompanying drawings and appended claims. It should, however, be remembered that, without desire of limitation, the invention will be described and illustrated as the preferred embodiments of the invention in a protective screen for a frying pan. Certain changes and variations in the invention may suggest themselves to those skilled in the pertinent arts upon review of this application, which changes may not, however, depart from the spirit of this invention and may come within the scope of the appended claims.

In the accompanying drawings:

FIGURE 1, is a side elevational view of a longitudinally extended sectional screen, showing only part of the assembled screen frames covered with metal foil;

FIGURE 2, is a side elevational view of a longitudinally extended variation of the improved sectional and foil covered screen, showing the foil retainers and the utensil retainers;

FIGURE 3, is a side elevational view of the longitudinally extended hinged frame portions of a variation of the improved sectional screen and provided with a hinged cover frame section;

FIGURE 4, is a perspective view of the improved foil covered screen using the frame structure shown in FIGURE 3, and arranged in operative position over an electrically heated frying pan, including a dotted line representation of the cover portion of the screen in a partially elevated position;

FIGURE 5 is a perspective view of the improved hinge element of the type shown as hingedly or pivotally joining the screen frame sections of the screens shown in FIGURES 2, 3 and 4; and FIGURE 6 is a vertical sectional view taken along line 6—6 of FIGURE 4 of the drawings.

Referring to the drawings, wherein like elements are identified by like numerals, and referring particularly to FIGURE 1 of the drawings, 10 represents generally the improved grill-type metal foil covered screen or shield, which, in the variation shown in FIGURE 1, includes the three longitudinally extending and substantially rectangular and equal height and substantially flat and end to end juxtaposed openwork frame sections 11, 12 and 13. The outer rigid frame or border or edge element 14 of each of the sections 11, 12 and 13 is formed of relatively stiff or rigid and heavy wire or thin rod, as for example, No. 10 iron or steel wire, suitably coated, and having the ends thereof joined, as for example, by welding or brazing, or similar suitable joining method. The elements 14 form the top and bottom and side edges of each frame section. All of the corners of the substantially rectangular outer frame elements 14 are rounded as at 15. Each of the sections 11, 12 and 13 is provided with two horizontally extending and parallel bracing elements 16, which may be formed of similar but lighter wire or rod, as for example No. 12 wire. Elements 16, which are parallel to the top and bottom edges of the respective frame section may be welded at their opposite ends to the vertical branches or end or side edge portions of the associated section frame 14. End sections or side frame members 11 and 13 are provided at their respective upper-outer corners, as shown in FIGURE 1, with reentrant curves, as at 17, whereby to improve the general appearance of the assembled screen device. Sections 11, 12 and 13 are loosely hinged or pivotally supported together at their adjacent vertical edges by wire loop-type hinges 18 to form a longitudinally flexible support for a covering material. Hinges 18 are sufficiently loosely fitted onto frame elements 14 as to permit a limited degree of relative vertical adjustment between the sections 11, 12 and 13 within the sliding range of hinges 18, and to permit free angular adjustment.

A continuous strip of highly polished metal foil, such as for example, the highly polished aluminum foil commonly used in kitchens, is provided as covering 19 on one side of the assembled frame sections 11, 12 and 13, as illustrated in broken away section in FIGURE 1. Such heat reflective and insulating foil covering 19 may be conveniently applied by longitudinally extending the screen 10, applying a suitable length of the metal foil to cover one side of the hingedly joined screen sections and then crimping the edges of the foil 19 around the outer portions of the frame elements 14 of the assembled and extended sections 11, 12 and 13. Having thus covered the one side of the sections 11, 12 and 13 with the length of highly polished metal foil, such as aluminum foil, with the highly polished surface of the foil directed outwardly from the longitudinally extended frames 11, 12 and 13 of the screen 10, the hinged frame sections 11, 12 and 13 are then pivoted relative to one another to form a three-sided enclosure which may then be placed around the outer edge of a utensil, such as a frying pan. In such enclosure, support section 12 forms the rear or central support or frame member and frame sections 11 and 13 form the side support members. Grease and other food particles, etc. splattered from the frying pan will then be caught by the metal foil covering 19 of the screen 10. When the surface of the metal foil covering 19 of screen 10 becomes soiled, it may be easily removed for disposal by merely pulling on the foil with sufficient force to uncrimp the foil from the outer frame elements 14. The screen may be readied for further use by applying a clean foil covering to sections 11, 12 and 13 in the manner as described above.

The modification of the improved utensil screen shown in FIGURE 2, is comprised of four end to end arranged and hingedly joined and substantially rectangular and substantially flat frame sections 20, 21, 22, and 23, having outer frame elements 14 and rounded corners 15, and also having horizontal bracing elements 16. The border elements 14 and brace elements 16 are preferably formed of wire or suitable rod as described above with respect to the same numbered elements of the modification of the improved screen shown in FIGURE 1.

The juxtaposed sections 20–23 arranged in end to end longitudinal extension as shown in FIGURE 2, are hingedly or pivotally and releasably joined one to another along their adjacent vertical edges by resilient or spring-clip or snap-on type of partially open or slotted double eye hinges 24. Like unto the wire hinges 18 of FIGURE 1, the spring clip hinges 24 are pivotally engaged over and are vertically slidable on the hinge engaged vertical section of the border elements 14 of the sections 20–23, and are slidable within the limits of possible motion afforded between the horizontal braces 16 and the associated horizontal reaches or lengths of the frame elements 14. Due to the resilient nature of the spring clip or snap-on hinges 24 and the slotted eyelet formation of the ends of the hinges, such hinges 24, as distinguished from the hinges 18, may be easily applied and easily removed from the sections 20–23, whereby to enable the easy collapsing or complete disassembly and also the assembly of the sections 20–23 of the modified screen 10 of FIGURE 2. Obviously, more than the illustrated number of hinges 24 may be used to pivotally join adjacent ones of the sections 20–23.

The front support or frame section 23 has its top edge at the same elevation as the top edges of the side sections 20 and 22 and the rear or central section 21. Section 23 is, however, narrower than the sections 20–22 and therefore has its bottom edge spaced at an appreciable distance above the lower edges of the sections 20–22. Such elevated spacing of the lower edge of section 23 permits the complete lateral enclosing of a handled utensel, such as a frying pan, to be screened within the sections 20–23 when those sections are pivoted or hinged into an arrangement to form a substantially rectangular enclosure with the section 23 positioned above the handle of the utensil.

The screen 10 as shown in FIGURE 2 may be easily prepared for use by extending the sections 20–23 longitudinally and lying flat upon a flat surface, such as a table top. A length of bright metal foil 19, of a width and length to cover one side of the sections 20–23 plus a little additional or excess width along the lower edges of sections 20–22, is placed over the thus arranged sections 20–23 with the top edge of the foil 19 extending slightly above the upper edges of the sections 20–23. The upper edge of the foil 19 is then crimped over the upper portions of the frame elements 14 of the sections 20–23 as shown in FIGURE 2. The crimping is done in such a fashion as to force the free ends of the foil securing or retaining prongs 25, which extend upwardly from the upper branches of the frames 14 of the sections 20–23 through puncture holes formed in the crimping operation in the foil 19. The same procedure is then followed along the lower edges of the sections 20–23, forcing the downwardly directed retaining prongs 25 positioned along those lower edges of the sections 20–23 through corresponding puncture openings similarly formed in the foil 19 to thus releasably support the readily disposable foil covering 19. Obviously, the width of the foil 19 must be reduced along the lower edge of the section 23.

In applying the foil 19 to the extended sections 20–22, the excess width of the foil is extended beyond the lower edges 14 of sections 20–22, and the excess foil is folded back over the prongs 25 to force the prongs through the foil 19. The lower edge of the foil is then reverse folded and the prongs 25 are again forced through the foil 19 and the excess flap of foil along the lower edges of sections 20–22 is arranged to extend inwardly from the operatively positioned screen sections 20–22 on the side thereof covered by the foil 19. The thus formed elongated and relatively narrow flap of foil along the lower edges of sections 20–22 may then be subsequently shaped and used to form a collecting trough and table shield as hereinafter described and as illustrated in FIGURES 4 and 6.

A hinge element 24 is releasably secured at the approximate mid point of the lower frame section 14 of screen section 23, and hingedly supports a U-shaped retainer or utensil positioning element 26 which may be pivoted into a position where the free ends of the retainer 26 are directed downwardly to overlap the laterally extending handle of a frying pan housed within screen 10 of FIGURE 2 when such screen is assembled in operative position about such a pan. To further secure the frying pan and the screen 10 in relative operative position with respect to one another, a utensil positioning or retaining hook element 27 is pivotally carried by the lower one of the horizontal brace elements 16 of the frame section 21, for releasable engagement with the adjacent edge of the frying pan when positioned in operative position within the screen of FIGURE 2.

The variant of the improved screen arrangement 10, as shown in FIGURE 3, is the same as that shown in FIGURE 2, except that the metal foil covering 19 is not shown in FIGURE 3, and except that the rear or central section 21 hingedly carries a substantially rectangular cover or frame element 28. Cover element 28 is comprised of an outer frame section 14 and horizontal brace elements 16 in the same manner as the sections 20–23. Cover section or frame 28 is of the same size as the screen section 21 and has its lower or rear edge hingedly or pivotally supported upon the adjacent upper edge of the section 21 by readily releasable hinge elements 24. Section 28 is provided on its two opposite side edges with outwardly extending support studs 29 adapted to engage or rest upon the upper edges of side sections 20 and 22 when the screen 10 of FIGURE 3 is formed into a substantially rectangular enclosure as shown in FIGURE 4, whereby to support section 28 in substantially horizontal position along the top edges of the sections 20–23, thereby forming an enclosure for the sides and the top of the utensil housed within such enclosure. Section 28 is provided along its upper or front and lower or rear edges, as shown in FIGURE 3, with foil retaining prongs 25 in the same manner as the sections 20–23, and metal foil 19 is applied to the section 28 in the same general manner as the foil is applied to the section 23.

The hinge 24, as shown on an enlarged scale in FIGURE 5, may, if desired, be formed of two elongated and juxtaposed and relatively narrow strips of resilient metal 33, having abutting flat central portions 34 and inwardly opening and oppositely positioned curved portions 35 coacting to form the slotted or partially open eyelets at the opposite ends of the hinge 24. The outer ends of the eyelet elements 35 are provided with rolled ribs 36 to facilitate the use of the hinges in the operation of applying the hinges to the frame elements 14. The central portions 34 may be permanently joined together at their mid sections as by a spot welding 37.

The perspective view of FIGURE 4 and the sectional view of FIGURE 6, show the improved screen formed of sections 20–23 and 28 of FIGURE 3, provided with an innermetal foil covering 19 applied in the manner described with respect to FIGURE 2, and positioned in operative arrangement about an electric-type of frying pan 30. Hook 27 is releasably engaged over the rear edge of the pan 30 and retainer 26 is releasably engaged over the handle 31 of pan 30. The elongated flap of metal foil along the lower edges of the sections 20–22 is directed inwardly and upwardly to form a trough 32 along the lower edges of sections 20–22. The trough 32 is of a width sufficient to extend inwardly to underlie the adjacent edges of the pan 30, thereby functioning not only as a trough along the lower edges of the sections 20–22 but also functioning as a covering for the exposed surfaces supporting pan 30 immediately inwardly of the screen 10.

From the foregoing description of this invention and from the accompanying drawings, it will be apparent that this invention realizes the introductorily enumerated objectives respecting the improvements in a screen device for a cooking utensil particularly well adapted to prevent the spattering of food particles onto adjacent surfaces and particularly well adapted to improve the heating efficiency and cooking characteristics of the utensil and to insulate adjacent surfaces from the effects of the heat dissipated by the utensil. It will similarly be apparent that the invention also possesses the hereinbefore listed advantages and provides new, novel and useful improvements in screens for utensils.

Having thus described and illustrated the modifications of the preferred embodiments of this invention in improved screens for utensils, the invention is not to be interpreted as being restricted to the specifically illustrated and described embodiments of the invention as set forth in the drawings and as hereinbefore described, except insofar as is necessitated by the appended claims and the disclosures of the prior art.

The invention is hereby claimed as follows:

1. A foldable culinary shield device for a cooking utensil, comprising, in combination, longitudinally flexible support means comprised of a plurality of juxtaposed and end to end arranged frame members consisting of substantially rigid and uniplanar openwork having adjacent vertically disposed end edges and having upper and lower edges and adapted to be adjustably disposed with adjacent frame members in longitudinal disalignment whereby to establish a self supporting arrangement of the support means about at least a portion of the periphery of the side walls of a cooking utensil, hinge means pivotally interconnecting adjacent ones of said vertically disposed end edges, and a covering strip of highly polished and heat reflective metal foil carried by each said frame members, and releasably attached to the upper and to the lower edges of each said frame members and having an imperforate surface disposed adjacent said cooking utensil, said support when adjustably disposed about at least a portion of the side walls of a cooking utensil with the adjacent frame members in longitudinal disalignment being adapted to support itself upright with the foil covering adapted to receive spattered material from said utensil and to simultaneously and effectively reflect back to said utensil heat given off from said utensil.

2. In a device of the type described, a plurality of adjacent and substantially rectangular and vertically supported frame elements consisting of substantially rigid uniplanar openwork and adapted to be adjustably disposed in end to end arrangement, hinge means pivotally joining adjacent vertical end edge portions of adjacent frame elements, and securing means along the upper and lower edge portions of said frame elements releasably securing a highly polished and heat reflective strip of metal foil covering one side of said frame elements, said securing means along the lower edge portions of at least some of said frame elements functioning to support said frame elements, and said metal foil simultaneously functioning as an adjustable surface adapted to receive spattered material and to effectively reflect heat.

3. In combination, a plurality of substantially rectangular frame sections substantially vertically disposed in end to end arrangement to provide a partial enclosure for a cooking utensil and having adjacent sections hingedly joined one to another at their adjacent edge portions, hinge means joining said adjacent edge portions, a cooking utensil positioned within said enclosure, utensil retaining means pivotally carried by said frame sections and engaging said utensil to position said utensil in predetermined operative position within said enclosure, and metal foil covering means releasably secured to said frame device and covering the inner surfaces of said frame device, said metal foil covering means having highly polished and imperforate and heat reflective surface means directed inwardly toward said utensil.

4. A housing for a cooking utensil, comprising, in combination, a vertically disposed rear frame member means having end edges and a top edge, vertically disposed side frame member means joined respectively by hinge means to the opposite end edges of said rear frame member means and extending forwardly from said rear frame member means, a substantially horizontally disposed cover frame member means having a rear edge joined by hinge means to the top edge of said rear frame member means and having two side edges, support means extending outwardly from each of said side edges of said cover frame member means and adapted to engage said side frame member means, hinge means hingedly joining said rear frame member means with said side frame member means and with said cover frame member means, and an imperforate and heat reflective metal foil covering means for the interior of said housing, said metal foil being supported in readily releasable order upon each of said rear frame member means and said side frame member means and said cover frame member means.

5. A device according to claim 4, wherein said side frame member means are of the same height as said rear frame member means, a front frame member means joined by hinge means at one end thereof to the upper portion of the adjacent end of one of said side frame member means, said front frame member having the upper edge thereof positioned at the same elevation as the upper edges of said side frame member means and having the lower edge thereof positioned above the elevation of the lower edges of said side frame member means, and a heat reflective metal foil covering the inner surface of said front frame member means and releasably secured to said front frame member means.

6. A device according to claim 4, having utensil positioning means pivotally carried by said housing for engaging a utensil housed within said housing and positioning said housing with respect to said utensil, and a utensil housed within said housing.

7. A device according to claim 4, wherein said rear frame member means and said cover frame member means each consists of shape retaining and uniplanar openwork and each includes respectively a substantially rectangular and continuous outer frame element having two end edges and a bracing member fixed at its opposite ends to said frame element.

8. A device according to claim 4, wherein said hinge means has opposite ends and is formed of resilient material and is provided at each of its opposite ends with a partially open eyelet adapted to be snapped onto and snapped off of the edges of said frame member means.

9. A device according to claim 4, wherein said frame member means are provided with outwardly projecting rigid foil support means for releasably supporting foil upon said frame member means.

10. A sectional utensil shield having a readily attachable and readily detachable heat reflective and insulating and spatter protective covering, comprising, in combination, a substantially rectangular central support frame means adapted for vertical disposition adjacent a utensil, substantially rectangular side support frame means adjacently disposed with respect to said central support frame means along opposite ends of said central support frame means and adapted for vertical disposition adjacent a utensil, hinge means hingedly connecting said central support frame means and said side support frame means along their adjacent edges, said frame means and said hinge means being constructed and arranged for pivotal relative movement from a folded position to positions in which said side support frame means extend outwardly from and transversely of the plane of a side of said central support frame means, said central support frame means and said side support frame means each being comprised of shape retaining and uniplanar openwork and each including rigid border means defining its upper edge and its lower edge and its side edges, each said hinge means being formed of resilient material and having a slotted eyelet in each of its opposite ends adapted to be snapped onto and snapped off of the border means of said frame means, and metal foil covering means for the one side of said hingedly connected central support frame means and said side support frame means and secured thereto in readily releasable manner and having a heat reflective and imperforate surface directed toward said utensil and covering the sides of said central support frame means and said side support frame means adjacent said utensil.

11. A utensil screen comprising, in combination, a plurality of substantially flat and substanially rectangular and end to end arranged frame sections of substantially rigid openwork having end edges and top and bottom edges and adapted for vertical disposition around portions of the periphery of a utensil, hinge means pivotally joining adjacent end edges of said frame sections for hinging movement of said frame sections with respect to one another, and a single continuous and imperforate sheet of metal foil covering means secured in readily releasable manner to the outer ones of said edges of the pivotally joined frame sections, said metal foil covering means having a highly polished and heat reflective and imperforate surface directed toward the utensil screened by said utensil screen.

12. A utensil screen according to claim 11, having metal foil retaining means on at least some of the edges of said screen sections.

13. A sectional device for shielding a utensil, comprising, in combination, a plurality of substantially flat and substantially recangular and end to end arranged frames each of which is comprised of substantially uniplanar metal openwork having end edge sections and top and bottom edge sections and adapted for disposition around portions of the periphery of a utensil, readily releasable and resilient hinge means pivotally joining adjacent end edge sections of said frames for hinging movement of said frames with respect to one another, said hinge means and said end edge sections being so constructed and arranged that portions of said end edge sections are pivotally and releasably clamped in said hinge means and comprise the pivot portions of said hinge means, and an imperforate sheet of metal foil secured in readily releasable manner to the outer ones of said edges of said end to end arranged frames, said metal foil having a highly polished and heat reflective surface directed toward the position adapted to be occupied by a utensil to be shielded.

14. A utensil screen assembly having a readily attachable and readily detachable heat reflective and insulating and spatter protective covering, comprising, in combination, a substantially rectangular central support frame means adapted for vertical disposition adjacent a utensil, substantially rectangular side support frame means adjacently disposed with respect to said central support frame means one along each end of said central support frame means and adapted for vertical disposition adjacent a utensil, hinge means hingedly connecting said central support frame means and said side support frame means along their adjacent edges, said frame means and said hinge means being constructed and arranged for pivotal relative movement from a folded position to positions in which said side support frame means extend outwardly in the same direction from the plane of a side of said central support frame means, said central support frame means and said side support frame means each including rigid border means defining its upper edge and its lower edge and its side edges, metal foil covering means for the one side of said hingedly connected central support frame means and said side support frame means and secured thereto in readily releasable manner and having a heat reflective and imperforate surface directed toward said utensil and covering the sides of said central support frame means and said side support frame means adjacent said utensil, and metal foil retaining means extending upwardly and downwardly respectively from the border means defining the upper edges and the lower edges respectively of said central support frame means and said side support frame means, said metal foil retaining means extending downwardly from said border means also comprising supports for said utensil screen assembly.

15. A utensil screen assembly according to claim 14, having a cover frame means pivotally carried by hinge means on the border means defining the upper edge of said central support frame means, and metal foil cover means secured to said cover frame means in readily releasable manner.

References Cited in the file of this patent
UNITED STATES PATENTS

| | | |
|---|---|---|
| 905,762 | Sykes | Dec. 1, 1908 |
| 1,151,491 | Macdaniel | Aug. 24, 1915 |
| 2,563,078 | Silberman | Aug. 7, 1951 |
| 2,568,637 | Jardim | Sept. 18, 1951 |
| 2,820,513 | Drakoff | Jan. 21, 1958 |